B. F. ADAMS.
Corn and Cotton Seed Planter.
No. 202,133.  Patented April 9, 1878.
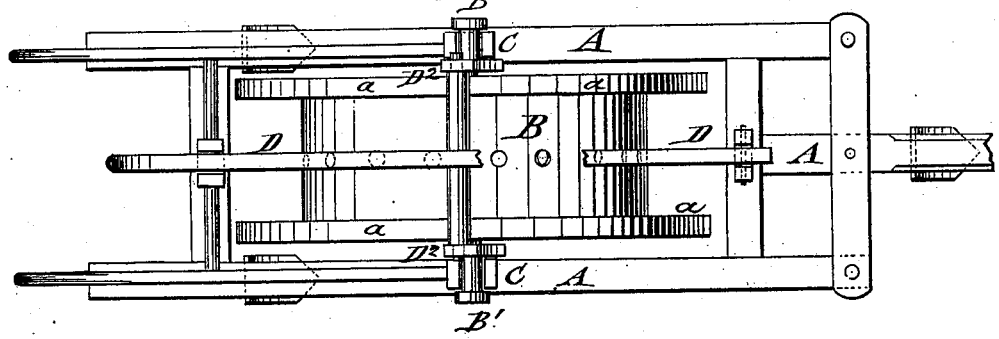
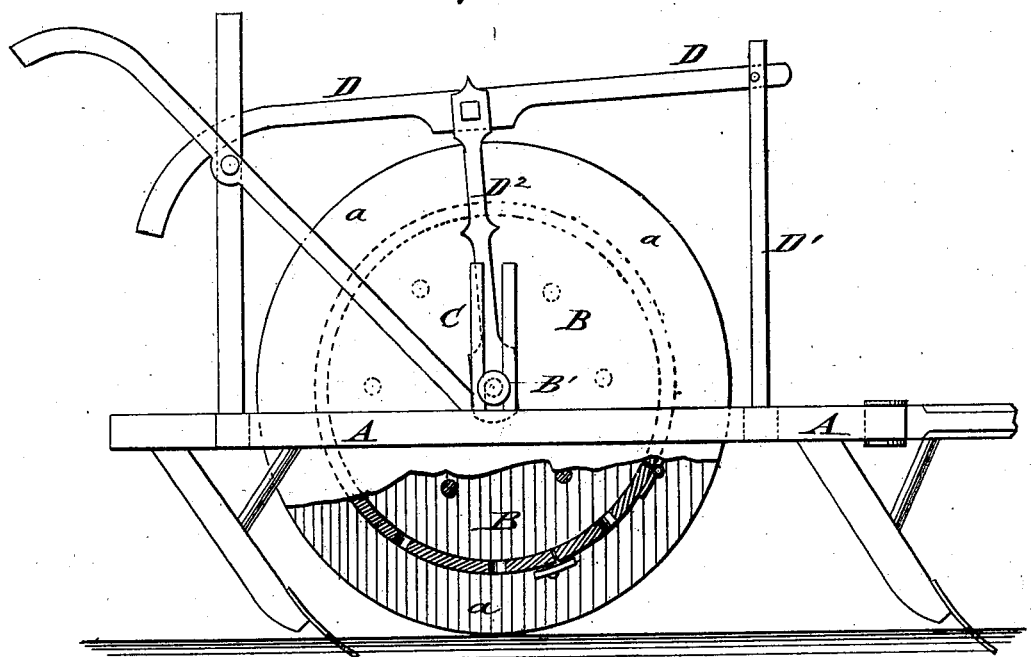

UNITED STATES PATENT OFFICE.

BENJAMIN F. ADAMS, OF BURTON, TEXAS.

IMPROVEMENT IN CORN AND COTTON-SEED PLANTERS.

Specification forming part of Letters Patent No. 202,133, dated April 9, 1878; application filed December 14, 1877.

*To all whom it may concern:*

Be it known that I, BENJAMIN F. ADAMS, of Burton, in the county of Washington and State of Texas, have invented a new and Improved Corn and Cotton-Seed Planter, of which the following is a specification:

In the accompanying drawings, Figure 1 represents a top view, and Fig. 2 a side elevation, partly in section, of my improved corn-planter.

Similar letters of reference indicate corresponding parts.

This invention relates to an improved machine for planting corn, cotton, and other seed, that combines cheapness, simplicity, and practicability, adjusts itself to the uneven surface of the ground without interfering with the depth of the plows, and admits the dropping of the seed in easy and convenient manner.

The invention consists of a frame with central front and side rear plows, carrying in slotted uprights the flanged seed-box, that moves vertically therein, and may be raised to interrupt the dropping of the seed by a lever and connection-frame attached to shaft of drum.

In the drawing, A represents the supporting-frame, which is made of two side pieces stiffened by cross-pieces, and of a front center piece or beam. A plow is applied to the front piece to open the furrow, and a smaller plow to each rear corner of the frame to cover the seed.

The handles are attached to the side pieces of the frame in the ordinary way.

The seed-box or hollow wheel B is supported in the frame A, directly in the rear of the front plow, the shaft B' of the drum turning in slotted uprights C, that are rigidly secured to the side pieces of frame A. The slotted uprights admit the rising or falling of the seed-drum as the surface of the ground varies without interfering with the depth or gage of the plows.

The seed-drum B is made with side flanges $a$, that extend about three inches beyond the circumference of the drum proper, so that the drum rolls by these flanges on the ground. The seed is placed in the drum through an opening with hinged door, and dropped through the face of the drum by means of small holes or slots, that are gaged by slides or buttons dropping through the same.

The drum B can be raised or lowered by a lever, D, that is pivoted to a front upright, $D^1$, and attached to the shaft B' by swinging arms $D^2$, applied to a cross-piece of the lever.

The dropping of the seed can be stopped at will by raising the drum, even when the planter is turned at the end of the field.

The single seed-drum adjusts itself by its vertical motion in the slotted uprights to the unevenness of the ground, while the flanges prevent the face of the drum from touching the ground, and give friction enough to turn the drum.

By lifting the drum the dropping is readily controlled, and thus a simple and economical planter for corn and other seed obtained.

Having thus described my invention, I claim as new and desire to secure by Letters Patent—

In a seed-planter, the combination, with the slotted uprights of the supporting-frame, of a flanged revolving drum, and of a hand-lever connected to the shaft of the drum, to raise or lower the drum for interrupting or continuing the dropping of the seed, substantially as specified.

BENJAMIN FRANKLIN ADAMS.

Witnesses:
W. P. CARTER,
BRANCH A. WATSON.